Patented Oct. 7, 1947

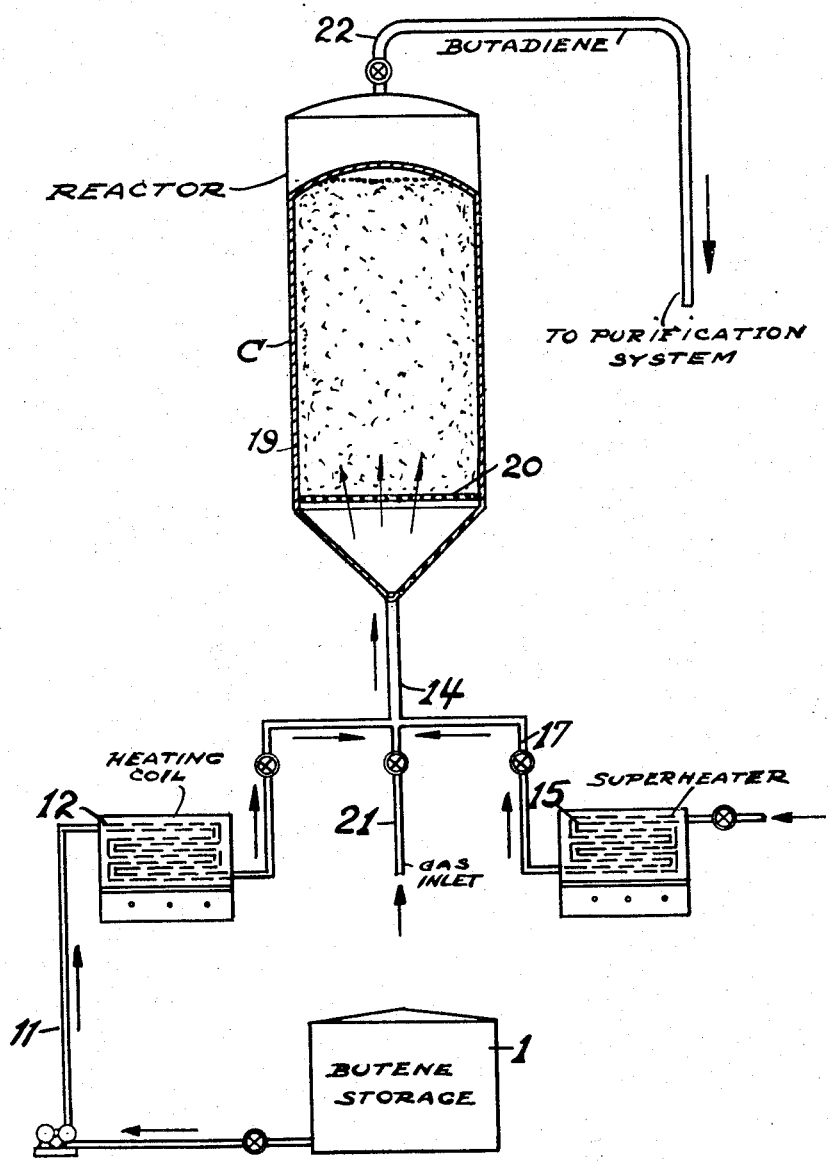

2,428,624

UNITED STATES PATENT OFFICE 2,428,624

METHOD OF DEHYDROGENATING BUTENE

Clinton H. Holder, Cranford, N. J., assignor to Standard Oil Development Company, a corporation of Delaware Application November 10, 1943, Serial No. 509,647

15 Claims. (Cl. 260—680)

The present invention relates to improvements in the art of dehydrogenating hydrocarbons, and more particularly, relates to the art of dehydrogenating mono-olefins and compounds, such as alkylated aromatics.

The production of synthetic rubber or rubber-like material has necessitated for many of these new products, the manufacture of intermediates in larger quantities than they have heretofore been manufactured. These new intermediates include substances, such as butadiene, styrene, and the like. For example, a product known as Buna-S is prepared by reacting together under suitable conditions of temperature and pressure, butadiene and styrene. The production of butadiene in normal oil refining practice is not great and this particular intermediate is now being manufactured in special plants in greater quantity than heretofore and additional plants for making this material are in the process of construction. Similarly, styrene plants are also being expanded or new ones constructed in order to prepare this necessary intermediate for synthetic rubber.

In the accompanying drawing, I have shown diagrammatically, an apparatus in which a preferred embodiment of my invention may be carried into practical effect.

Referring to the drawing, butene-2 is withdrawn from storage 1 through line 11, thence heated in a furnace 12. Meanwhile, steam is superheated in superheater 15, withdrawn through line 17 and mixed in line 14 with preheated butene-2 withdrawn from heater 12. The mixture then passes into reactor 19 containing catalyst C, later identified. The catalyst is usually in the form of pills or pellets supported on a screen or grid 20. The product containing butadiene is withdrawn at 22 and delivered to a purification system (not shown) whereby after separation of water, the hydrocarbons are solvent extracted, distilled, etc., in known manner to produce the desired product. I have not shown a complete plant with all of its accessory equipment such as heat exchangers, flow meters, and the like, but only sufficient to enable a complete understanding of my invention. Periodically the valve in line 11 is closed and the catalyst is treated with steam to remove deposits. The novelty in my present invention relates to including a small amount of $CO_2$ in the charge and to this end I admit $CO_2$ or a $CO_2$-containing gas from line 21 into line 14.

While there are several methods of preparing butadiene, one satisfactory method involves the dehydrogenation of butenes. A number of catalysts have been proposed for this reaction, including the oxides of the IV, V and VI group of the periodic system usually supported on a carrier, such as magnesium oxide or the like. However, oxide catalysts, such as molybdenum oxide or chromium oxide, when used to dehydrogenate butadiene, are not as suitable as other types of catalysts in that the former are sensitive to steam. This sensitivity of the oxide catalysts of the VI group element to steam is a disadvantage in their use because the dehydrogenation of butene to butadiene is an operation which is preferably carried out under low pressure. If attempts are made to lower the partial pressure of the butene with steam, a catalyst, such as chromium oxide, and the like, is affected by the steam and therefore the said steam cannot be used. Of course, it is possible to dehydrogenate butene in undiluted condition but this requires relatively low pressures, namely, of the order of one-eighth of an atmosphere or lower. On the other hand, there has been developed, as previously indicated, a catalyst which is not sensitive to steam. Thus, in the application of Kenneth K. Kearby, Serial No. 430,873, filed February 14, 1942, there is disclosed a catalyst consisting of a major portion of magnesium oxide, a minor portion of an iron oxide, a stabilizer, such as copper oxide, and a promoter, such as $K_2O$. In the preparation of this catalyst the most practical form of potassium to include is the carbonate. A representative composition of the catalyst is as follows:

| | Per cent |
|---|---|
| MgO | 70 |
| $Fe_2O_3$ | 20 |
| $K_2O$ | 5 |
| CuO | 5 |

This catalyst under actual test has proved to be satisfactory and to give good yields with high selectivity when used in the dehydrogenation of butene to form butadiene. A good way to operate the process is to dilute the butene feed going to the reactor with 8 or 10 volumes of steam and when the gas pressure in the reactor itself is about 1 atmosphere, it will be obvious that the partial pressure of the butene will be from one-eighth to one-tenth of an atmosphere. At this relatively low pressure dehydrogenation products may be formed.

It is characteristic of the mono-olefin dehydrogenation reaction that carbonaceous material deposits on the catalyst but this may be removed by steam at normal reaction temperatures, this reaction being promoted by the presence of the potassium in the catalyst. Thus, it is customary to employ a cyclic procedure consisting of an hour reaction period while feeding both steam and hydrocarbon followed by a regeneration period of the same duration in which only steam is fed. Typical operating conditions are as follows:

Inlet temperature 1225° F., average reactor temperature 1150° F., average reactor pressure 8#/sq. in. gauge, 200 volumes of butene/catalyst volume/hr., 2000 volumes of steam during dehydrogenation/catalyst vol./hr., and 500 volumes of steam during regeneration/catalyst vol./hr. The complete cycle consists of a one-hour dehydrogenation and a one-hour regeneration period, the original catalyst containing approximately 5% $K_2O$.

In operating this process as described above, however, it has been found that the catalyst loses potassium oxide by volatilization. Since the purpose of the potassium is to keep the catalyst relatively free of coke by promoting the water gas reaction, it is obvious that the useful life of the catalyst will be greatly shortened by the accumulation of coke resulting from potassium losses. The following analyses of samples representative of various positions in a catalyst bed after 980 hours of operation illustrate how the loss first occurs at the inlet and gradually works down through the bed.

| Vol. Per Cent of Total Bed | Per Cent $K_2O$ in Sample |
| --- | --- |
| Cut #1—Inlet 2% | 0.8 |
| Cut #2—10% | 0.8 |
| Cut #3—10% | 1.6 |
| Cut #4—15% | 5.5 |
| Cut #5—15% | 5.1 |
| Cut #6—15% | 5.0 |
| Cut #7—20% | 4.4 |
| Cut #8—Outlet 13% | 5.0 |

Since it is apparent that the potassium carbonate in the catalyst is somewhat volatile, one rather obvious means of combating this problem consists of placing a small quantity of potassium carbonate on the top of the catalyst or at some point where the hot incoming feed gases contact the potassium carbonate. Another consists of injecting into the hot feed line a small quantity of a potassium compound such as the carbonate or the hydroxide, in liquid form as an aqueous solution or as molten hydroxide. Both of these methods depend on partially saturating the incoming stream with a volatilized potassium compound thereby reducing the amount contributed by the catalyst. My experience has been that with each of these procedures plugging of the reactor occurred in short order due, presumably, to deposition of the potassium compound at some point in the reactor bed. Although this may not always occur, it is, however, an inherent disadvantage. As will be evident later, this was probably the result of the partial pressure of the $CO_2$ produced in the reaction zone which caused precipitation of the volatile potassium compound by reconverting it to the relatively non-volatile compound potassium carbonate.

I have found that the rate at which potassium is lost from the catalyst may be greatly reduced by including in the charge a relatively small quantity of carbon dioxide, namely, 0.1 to 0.5%. The useful life of the catalyst may be consequently prolonged since by maintaining the original potassium concentration in the catalyst by this means, the catalyst may be kept relatively free of coke by virtue of the promoter action of the potassium on the carbon-steam reaction. This procedure involves no risk of plugging the catalyst bed such as may occur in the case of the other methods, which were mentioned above, since no potassium is being added externally to the reactor.

The mechanism by which the invention works may be illustrated in the following manner. It is believed that the volatilization of $K_2CO_3$ occurs via the dissociation of the carbonate to $K_2O$ and $CO_2$ which in the presence of steam forms the relatively volatile compound KOH (M.P.=680° F.)

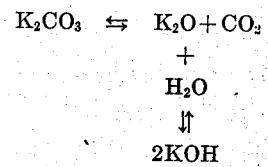

Although $K_2O$ has a rather low vapor pressure at about 1200° F. the presence of the steam converts this to KOH and consequently classifies this dissociation with the type in which a solid dissociates to two volatile components. When this system is at equilibrium it will possess a definite value for the equilibrium constant, $K_1$ which for the overall reaction is represented as follows:

$$K_1 = \frac{[CO_2] \cdot [KOH]^2}{[K_2CO_3]}$$

Since $K_1$ and the denominator are constant at any one temperature, it follows that $$[KOH]^2 = K_2 \cdot \frac{1}{[CO^2]}$$

where $K_2$ is a constant. Hence, it is evident that control of the concentration of potassium in the vapor state may be obtained by adjusting the $CO_2$ concentration and vice versa. Or, in other words, the rate of loss of potassium from catalysts of the type described above may be greatly retarded by adding a small amount of $CO_2$ with the feed.

That the loss of potassium from catalysts containing potassium carbonate does occur by the route described above is illustrated by the following evidence:

(1) I have found that the rate of volatilization of pure potassium carbonate in the presence of steam is much higher than the rate of loss of potassium from a catalyst during use, based on the analyses of these used catalysts. For instance, the rate of potassium carbonate loss was 24 lbs./million cubic feet of steam when pills of this material were steamed at 1250° F. whereas the rate of loss found for a typical catalyst was 0.5 lb./million cubic feet of steam or 48 times slower than with 100% steam. Presumably the $CO_2$ produced in the reactor by the reaction of steam and the coke on the catalyst influenced the rate of loss of potassium from the catalyst considerably. It should be pointed out, however, that even though the $CO_2$ concentration is as high as about 1% at the reactor outlet during either dehydrogenation or regeneration, this is of no avail in regard to the catalyst at the very beginning of the reaction zone although it will decrease the rate of loss of potassium from points further removed from the inlet. The inlet portion of the bed is always exposed to $CO_2$-free gases and as the catalyst loses potassium and becomes coked, the point in the catalyst bed at which the reaction begins to occur is further removed from the inlet thus permitting potassium depletion to progress through the bed.

(2) The following table shows the effect of the nature of the gas when subjecting $K_2CO_3$ pills to a gas stream at 1400° F.

| | | | |
|---|---|---|---|
| Temperature—°F | | 1400 | |
| Gas employed | Steam | Air | $N_2$ |
| Gas rate—vols. @ STP/vol./hr | 5450 | | 2160 |
| Partial press. of $K_2CO_3$ in outlet stream—mm. of Hg | 0.14 | 0.032 | 0.023 |
| Pounds of $K_2CO_3$/million c. f. of gas | 67 | 15 | 11 |

The lower gas rate employed in the air and $N_2$ experiments should permit a closer approach to saturation but on the other hand the apparent loss was only about ⅕ of that when using steam. Thus, with air and $N_2$ it is believed the dissociation still does occur but the $K_2O$, which is relatively non-volatile, remains on the pills whereas in the presence of steam this oxide is converted to the more volatile hydroxide, thus accounting for the apparent difference in the results since these are measured by the weight loss encountered.

The following experimental evidence shows the effect of $CO_2$ concentration in steam on the rate of volatilization of $K_2CO_3$. These data were obtained by steaming carbonate pills and measuring the weight loss when using $CO_2$ concentrations in the steam from 0 to 1%.

| | | | | | |
|---|---|---|---|---|---|
| Temperature—°F | | | 1400 | | |
| Steam rate—vols. @ STP/vol./hr | | | 4800 | | |
| Per cent $CO_2$ in steam | 0 | 0.1 | 0.2 | 0.5 | 1.0 |
| Partial pressure of $K_2CO_3$ in outlet steam—mm. of Hg | 0.050 | 0.027 | 0.017 | 0.0065 | 0.0016 |
| Number of $K_2CO_3$/million c. f. of steam | 24 | 13 | 8.0 | 3.1 | 0.76 |
| Actual number of times loss rate was retarded compared to rate without added $CO_2$ | | 1.9 | 2.8 | 7.7 | 31 |

0.1% of $CO_2$ will almost double the length of time required to volatilize the $K_2CO_3$, for instance. The experimental work thus confirms the theory postulated above in which it was stated that the potassium concentration in the vapor could be controlled by the $CO_2$ partial pressure and consequently it is therefore possible to extend the life of catalysts of the type described herein several times by using the method described in this invention. When no provision is made for retarding potassium loss from the catalyst the useful life of such catalysts has been found to be of the order of 2000 hours (83 days). Furthermore, if one replenishes the catalyst with potassium, for instance, by preceding the bed with $K_2CO_3$ pills, it has been discovered that the catalyst activity is restored markedly and in fact approaches that of fresh catalyst while at the same time an unusually large amount of $CO_2$ appeared in the outlet gases proving that the catalyst had become coked as it became deficient in potassium and that the catalyst was otherwise in good condition.

A particularly good illustration of the benefit to be derived from the invention herein described lies in two runs which I have made under similar conditions and over the same catalyst, the chief difference being that in one run I purposely introduced $CO_2$ into the reaction zone along with the feed while in the second case no $CO_2$ was added, in fact operation was similar to that which would be normally used by those familiar with the art.

| | Case I— $CO_2$ Added | Case II— No $CO_2$ Added |
|---|---|---|
| Hours of Operation | 944 | 980 |

| Vol. Per Cent of Total Bed | Per Cent $K_2O$ | Vol. Per Cent of Total Bed | Per Cent $K_2O$ |
|---|---|---|---|
| Cut #1A—Inlet 4.1% | [1] 0.85 | Cut #1—Inlet 2% | 0.8 |
| Cut #1B—8.4% | [1] 4.2 | Cut #2—10% | 0.8 |
| Cut #2—17.5% | 6.3 | Cut #3—10% | 1.6 |
| Cut #3—17.2% | 6.3 | Cut #4—15% | 5.5 |
| Cut #4—17.0% | 6.7 | Cut #5—15% | 5.1 |
| Cut #5—17.0% | 6.6 | Cut #6—15% | 5.0 |
| Cut #6—Outlet 18.8% | 6.3 | Cut #7—20% | 4.4 |
| | | Cut #8—Outlet 13% | 5.0 |

[1] An analysis of the combined cut #1 showed 2.3%. The original catalyst contained approximately 6.5% $K_2O$. The separation in cut 1A and 1B was made based on color. The low per cent $K_2O$ pills of cut 1A were dark due to coke accumulation.

Approximately 1% $CO_2$ by volume based on total charge was added over the first 100 cycles after which it was reduced to 0.05%. It is evident that even with the rather low $CO_2$ concentration employed in the greater part of this run the catalyst lost considerably less $K_2O$ than it did when operated without $CO_2$ addition.

The main object of my invention, therefore, is to carry out the dehydrogenation of a monoolefin or an alkylated aromatic using a catalyst containing a volatile compound of potassium serving as a promoter, under such conditions as to prevent the loss of the said volatile potassium compound by volatilization. I have found it best to employ 0.1 to 0.5 vol. % $CO_2$ with the charge and under such conditions the catalyst life will be extended to 2-5 times its useful life when $CO_2$ addition is not employed. In fact, when using $CO_2$ the catalyst life is usually terminated for some reason other than that it has lost potassium.

The foregoing examples are purely illustrative of my invention and do not impose any limitation thereon. For instance, it is intended that alkali metal carbonates in general be included in this invention and that such carbonates may be incorporated in various catalysts, such as those used for aromatization as well as those used for dehydrogenation.

The method employed to supply $CO_2$ to the reaction zone may vary depending on the particular circumstances. For instance one may burn a portion of the butene feed in order to generate the necessary $CO_2$. Another method consists of scrubbing $CO_2$ from the product gases and returning it to the reactor.

In operating this process, however, it has been found that the catalyst loses potassium oxide by volatilization and this results in the lowering of activity with a consequent loss of yields. The most practical form of potassium compound to include in the catalyst composition is potassium carbonate in the presence of steam which is added with the charge. The carbonate at the high temperatures of reaction is converted to hydroxide and this material is more volatile than the carbonate and the oxide and hence is carried off with the reaction products. It is to repress oxide or hydroxide formation that I add $CO_2$, for this addition tends to shift the equilibrium toward forming the least volatile compound of the three, viz., the carbonate.

What I claim is:

1. The method of dehydrogenating butene-2 which comprises forcing a mixture of steam and butene-2, and $CO_2$ in an amount representing a small fraction of the total charge through a bed of catalyst consisting of MgO, $Fe_2O_3$, and $K_2CO_3$ in a reaction zone, at elevated dehydrogenation temperatures but at a partial pressure of the butene-2 below atmospheric pressure, and recovering a product containing butadiene from said reaction.

2. The method of dehydrogenating butene which comprises charging a preheated mixture of steam and butene to a reaction zone containing a catalyst consisting essentially of MgO, $Fe_2O_3$, a stabilizer and a volatile alkali metal compound, maintaining the reactant at dehydrogenating temperatures and prolonging the activity of the catalyst by adding an amount of $CO_2$ representing a small fraction of the total charge.

3. The method of claim 2 in which the $CO_2$ is added by including a small amount of a gas containing the said $CO_2$ in the butene feed.

4. The method of claim 2 in which the catalyst originally contains $K_2CO_3$.

5. The method of claim 2 in which the stabilizer is CuO.

6. In the dehydrogenation of hydrocarbons charged under dehydrogenation conditions to a steam-resisting dehydrogenation catalyst containing a metal compound which is volatilizable under the reaction conditions and which forms a carbonate of relatively low volatility, wherein steam is used to reduce the partial pressure of the hydrocarbons during the dehydrogenation reaction, the improvement which comprises charging to the catalyst during the dehydrogenation reaction an amount of $CO_2$ representing a small fraction of the total charge to the catalyst but being sufficient to maintain said metal compound in the form of said carbonate of low volatility.

7. The method of claim 6 in which said metal compound is an alkali metal compound selected from the group consisting of alkali metal oxides and carbonates.

8. The method of claim 6 in which the $CO_2$ is not over 1% by volume of the total charge to the reaction zone, the hydrocarbon is butene-2 and the product of the dehydrogenation is butadiene.

9. The process of the method of claim 6 in which the metal compound is $K_2CO_3$.

10. In the dehydrogenation of an olefin in the presence of a steam-resisting dehydrogenation catalyst containing an active dehydrogenation oxide catalyst, a stabilizer and a promoter on a magnesium oxide carrier the promoter being originally a volatile alkali metal carbonate forming volatile products under reaction conditions wherein steam is used to reduce the partial pressure of the hydrocarbons during their dehydrogenation in a reaction zone, the improvement comprising charging to the reaction zone, which contains the catalyst, a total feed stock charge of an olefin and steam containing $CO_2$ in an amount representing a small fraction of the total charge but adequate for repressing loss of the promoter, maintaining the feed stock in contact with the catalyst at elevated temperatures and at a relatively low partial pressure of the said olefin for a sufficient period of time to effect the desired dehydrogenation of the hydrocarbons, and withdrawing reaction products from said reaction zone.

11. The method of claim 10 in which the $CO_2$ is not over 1% by volume of the total charge to the reaction zone, the olefin is butene-2 and the product butadiene.

12. The method of claim 10 in which the promoter is $K_2CO_3$.

13. The method of dehydrogenating hydrocarbons in the presence of a steam-resisting catalyst containing an active dehydrogenation iron oxide component, a stabilizer, and a minor amount of a promoter consisting of an alkali metal carbonate, which comprises maintaining the promoter as a carbonate by adding to a reaction charge of hydrocarbons and steam that contacts said catalyst during dehydrogenation of the hydrocarbons an amount of carbon dioxide that represents a small fraction of the total reaction charge and which prevents dissociation of the alkali metal carbonate.

14. The method of dehydrogenating hydrocarbons in the presence of a steam-resisting active dehydrogenation oxide catalyst, a stabilizer and a promoter consisting of potassium carbonate associated with said catalyst, which comprises maintaining the promoter as a carbonate by adding to a reaction charge of hydrocarbons and steam contacted with said catalyst, an amount of carbon dioxide that represents a small fraction of the total reaction charge and which prevents dissociation of the potassium carbonate.

15. The method of repressing the loss of potassium carbonate from a hydrocarbon conversion catalyst containing potassium carbonate as a promoter during exposure of said catalyst to high temperatures and steam in the conversion of hydrocarbon material, which comprises introducing into contact with said catalyst a sufficient quantity of added carbon dioxide to decrease loss of the potassium carbonate from the catalyst by dissociation and volatilization.

CLINTON H. HOLDER.

REFERENCES CITED

The following references are of record in the file of this patent:

UNITED STATES PATENTS

| Number | Name | Date |
|---|---|---|
| 1,732,381 | Schmidt et al. | Oct. 22, 1929 |
| 2,148,140 | Tropsch | Feb. 21, 1939 |
| 2,211,219 | Thacker | Aug. 13, 1940 |
| 2,315,107 | Chickinoff et al. | Mar. 30, 1943 |
| 2,367,620 | Schulze et al. | Jan. 16, 1945 |
| 2,391,646 | Schulze et al. | Dec. 25, 1945 |